United States Patent [19]
Sweet

[11] 3,805,009
[45] Apr. 16, 1974

[54] APPARATUS FOR SUPPLYING MICROWAVE ENERGY TO FOODS AS THEY ARE FRIED

[75] Inventor: Samuel G. Sweet, Minneapolis, Minn.

[73] Assignee: The Pillsbury Company, Minneapolis, Minn.

[22] Filed: Jan. 18, 1973

[21] Appl. No.: 324,697

[52] U.S. Cl. .............................................. 219/10.55
[51] Int. Cl. ............................................. H05b 9/06
[58] Field of Search ..................... 99/339; 219/10.55

[56] References Cited
UNITED STATES PATENTS
3,633,490  1/1972  Schiffmann ..................... 219/10.55
3,619,538  11/1971  Kallenborn ..................... 219/10.61

*Primary Examiner*—C. L. Albritton
*Assistant Examiner*—Hugh D. Jaeger

[57] ABSTRACT

Microwave energy is supplied to an antenna structure provided within a fat frier for applying the microwave energy at improved efficiency to food products floating on the surface of the heated fat and conveyed continuously beneath the antenna. The antenna consists of parallel rods which couple microwave energy to the food products, e.g., donuts positioned beneath the rods. The rods are positioned in a plane parallel to the surface of the fat and are arranged in a balanced linear structure made up of two parallel rods at a distance from one another which is a fraction of one wave length, (e.g., one-quarter of one wave length). Wave peaks are present one quarter of a wave length from a shorting plane placed at the end of each pair of rods. Several sets of such rods are connected by feeder lines that transfer energy from one rod pair to another. Around each rod is an electromagnetic field the strength of which drops by about half each quarter of an inch proceeding away from the rod thereby reducing the loss of power to the frying fat.

4 Claims, 8 Drawing Figures

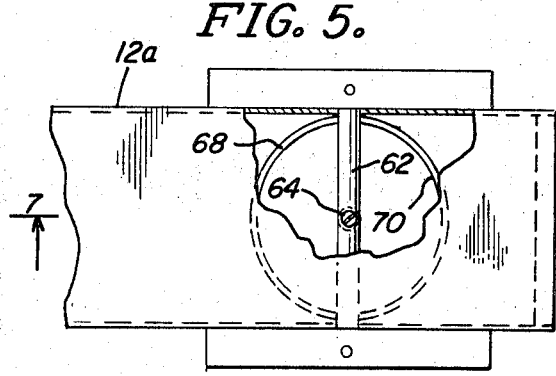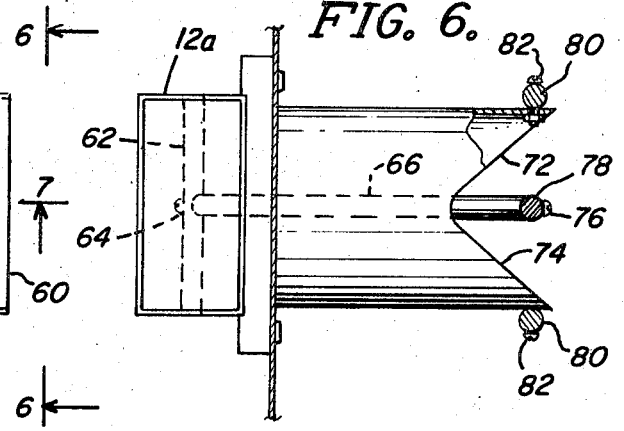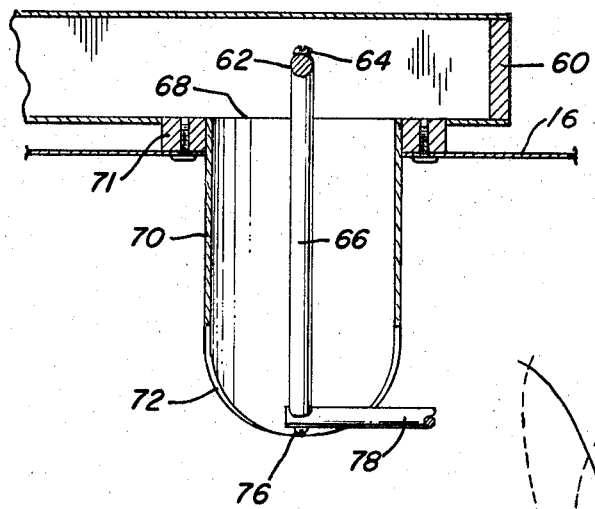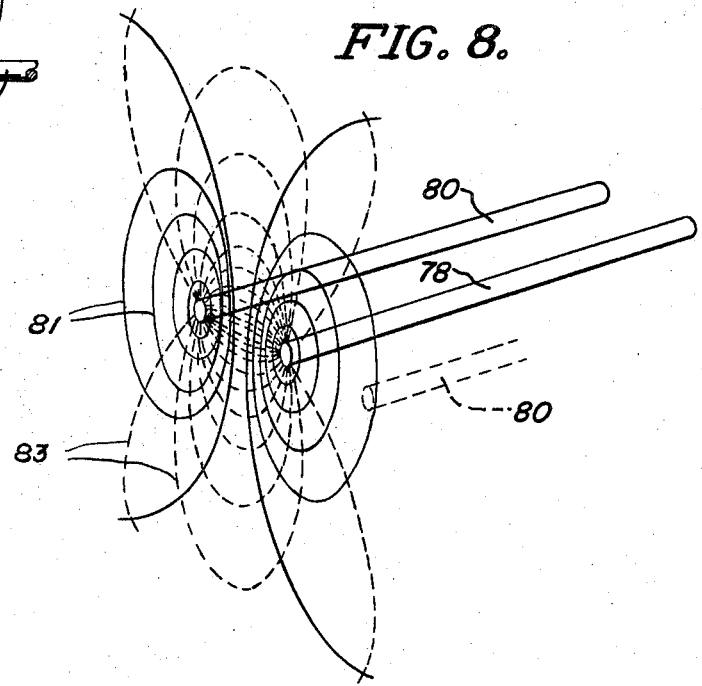

APPARATUS FOR SUPPLYING MICROWAVE ENERGY TO FOODS AS THEY ARE FRIED

FIELD OF THE INVENTION

The present invention relates to cooking equipment and more particularly to fat frying apparatus provided with a microwave energy supply to heat floating food products.

THE PRIOR ART

In the U.S. Pat. No. 2,997,566 is described a method for heating objects in hot frying fat by the application of microwave energy in which the frying fat is placed within a conventional box type microwave oven with microwave energy supplied through a wave guide to the top of the box. The loss of microwave energy into the fat is reduced by placing a metal screen or other microwave choke within the fat beneath the food product. The application of microwave energy in this way, by feeding the microwave energy via a wave guide directly into a chamber above (or around) the hot frying fat is inefficient for coupling microwave energy to the food product floating on the surface of the hot fat since the energy is reflected ramdomly throughout the chamber. Moreover, if an attempt were made to apply this principle to continuous conveyorized frying of food products, there is an opportunity for a substantial amount of the microwave energy to escape from the ends of the chamber to which microwave energy is supplied.

OBJECTS OF THE INVENTION

In view of these and other shortcomings of the prior art, the present invention has the following objects a) to increase the efficiency with which the microwave energy is coupled to the food products within a fat frier, b) to prevent the loss of microwave energy from the frier, c) to concentrate microwave energy in the region occupied by the parts of the food product exposed above the surface of the fat, d) to reduce the amount of coupling between the microwave energy supply and the frying fat and to distribute energy uniformly across the width of the frier and longitudinally within the microwave energy applicator.

THE FIGURES

FIG. 5 is a partial plan view of the coaxial transition between one of the wave guides and the antenna structure.

FIG. 6 is an elevational view taken on 6—6 of FIG. 5.

FIG. 7 is a vertical sectional view taken on line 7—7 of FIG. 5.

FIG. 8 is a semi-diagramatic perspective view of a pair of rods in accordance with the invention.

SUMMARY OF THE INVENTION

A conventional microwave energy supply is coupled to an antenna structure within a fat frier to apply microwave energy at an improved efficiency to the food products within the frier. The food products normally float on the surface of the fat with their upper portions exposed above the surface of the fat and are conveyed continuously from one end of the frier to the other beneath the antenna. The antenna is made up of a plurality of parallel rods which couple standing waves of microwave energy to the food products located just beneath the rods, i.e., less than a few inches, e.g., 3–4 inches and preferably from about 1/4 to 1½ inches. The rods are preferably positioned to lie on a plane parallel to the surface of the fat and are best arranged in a balanced linear array made up of at least two parallel rods at a distance from one another which is a fraction of one wave length, e.g., alternate rod pairs are displaced physically one-quarter wave length from one another. Shorting planes are placed at one end of each pair of rods. If several pairs of rods are used, they are connected by feeder lines which transfer energy from one rod to another. Between each pair of rods is an electromagnetic field of decreasing strength proceeding outwardly to reduce the loss of power to the frying fat.

DETAILED DESCRIPTION

In frying bakery products such as donuts, longjohns, bismarks etc., heat is usually provided only by the heated fat. In the present invention heat is also supplied by the antenna rod structure provided within the frier above the fat. The rod structure couples microwave energy at improved efficiency to the donuts or other food products floating on the surface of the fat. The antenna consists of at least one and preferably a plurality of rods which couple standing waves of microwave energy to the donuts located immediately beneath the rods. The rods are positioned to lie on a plane parallel to the surface of the fat in which the food products are floating and are arranged in an array composed of at least one and preferably several pairs of parallel rods separated by a distance which is a fractional part preferably less than about one-fourth of one wavelength. Rod pairs are displaced physically by about one-quarter wavelength from the next adjacent pair of rods in a direction perpendicular to the rod axis.

Figure 1:
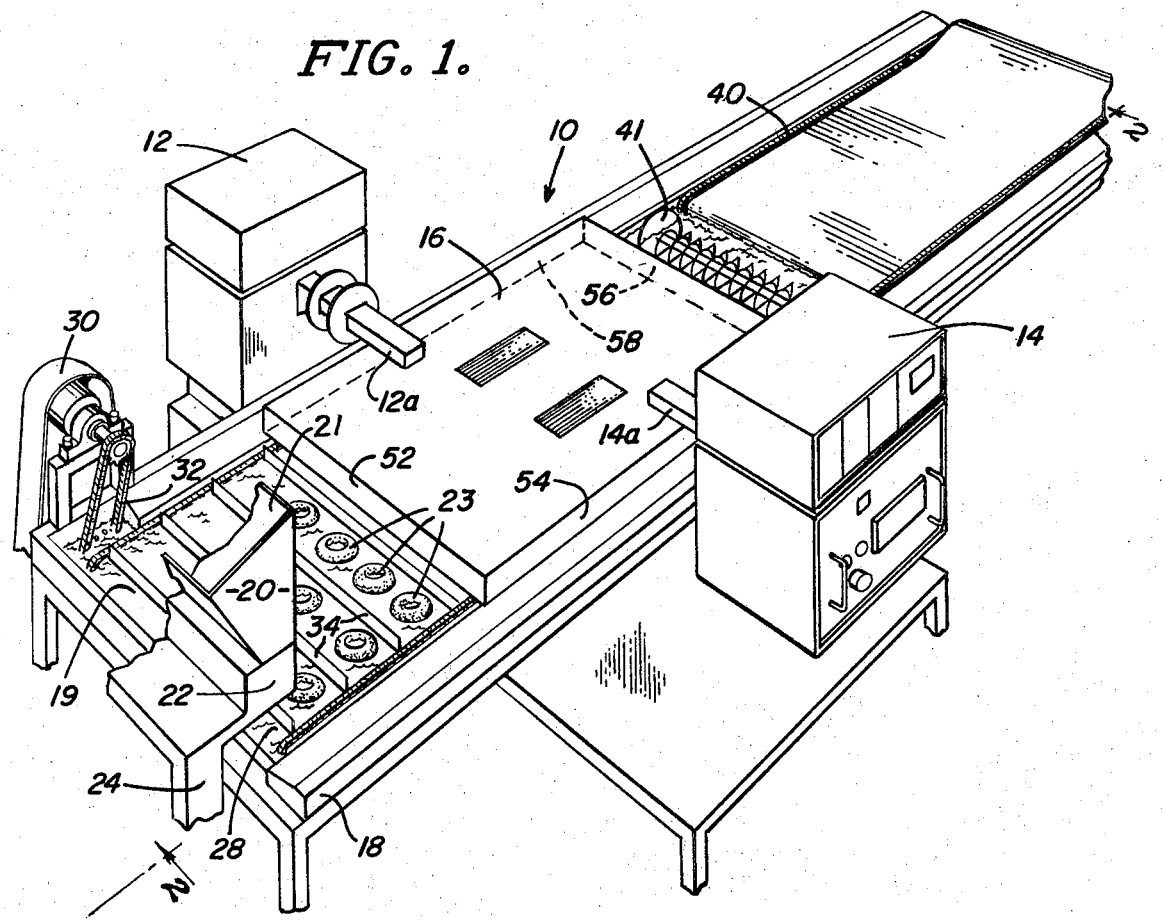
FIG. 1 is a perspective view of an apparatus embodying the invention.
Figure 2:
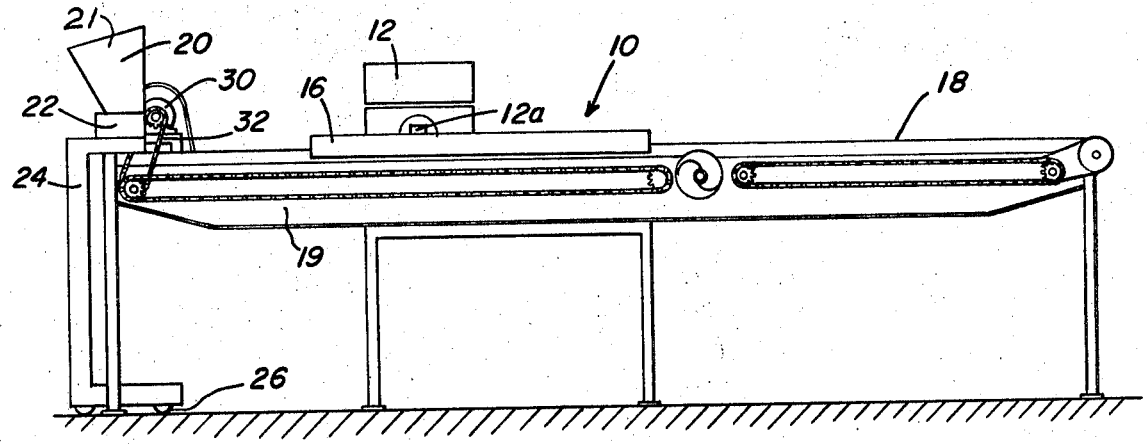
FIG. 2 is a side elevational view of the fryer of FIG. 1 taken on line 2—2 of FIG. 1.

Refer now to FIG. 1 in which is shown a fat fryer indicated generally at 10 consisting of a rectangular vessel filled with food grade frying fat heated to the proper temperature for frying articles such as donuts, longjohns, bismarcks, etc. by means of a gas fired burner or other heating means (not shown). The exposed portion of the food to be fried above the surface of the fat is heated with microwave energy supplied by two microwave energy generators 12 and 14 which may be of any known suitable construction to supply microwave energy at 2,450 megahertz and at a power of 5,000 watts. Each of the microwave generators supplies microwave energy through the usual wave guides indicated at 12a and 14a respectively to an applicator chamber 16 positioned just above the frying vessel indicated at 18 which contains the heated frying fat 19.

Positioned at the left end of the fryer 10 as seen in the figures is a donut former 20. Donut dough in hopper 21 is supplied to a donut depositor 22 of a suitable known construction supported on a framework 24 which is itself mounted on wheels 26 that enable the depositor to be placed in position above the fryer or remove as conditions require. Within the frying fat is a conventional donut conveyor 28 having a drive motor 30 which is connected thereto by a drivechain 32. The conveyor includes two laterally spaced sets of conveyor chains between which are supported transversely extending parallel flight bars 34 also of known construction. During operation, the donuts 23 which are dropped into the fat by the depositor 22 between the flights 34 are advanced by motor 30 from left to right on the surface of the hot fat toward the microwave applicator 16.

Figure 3:
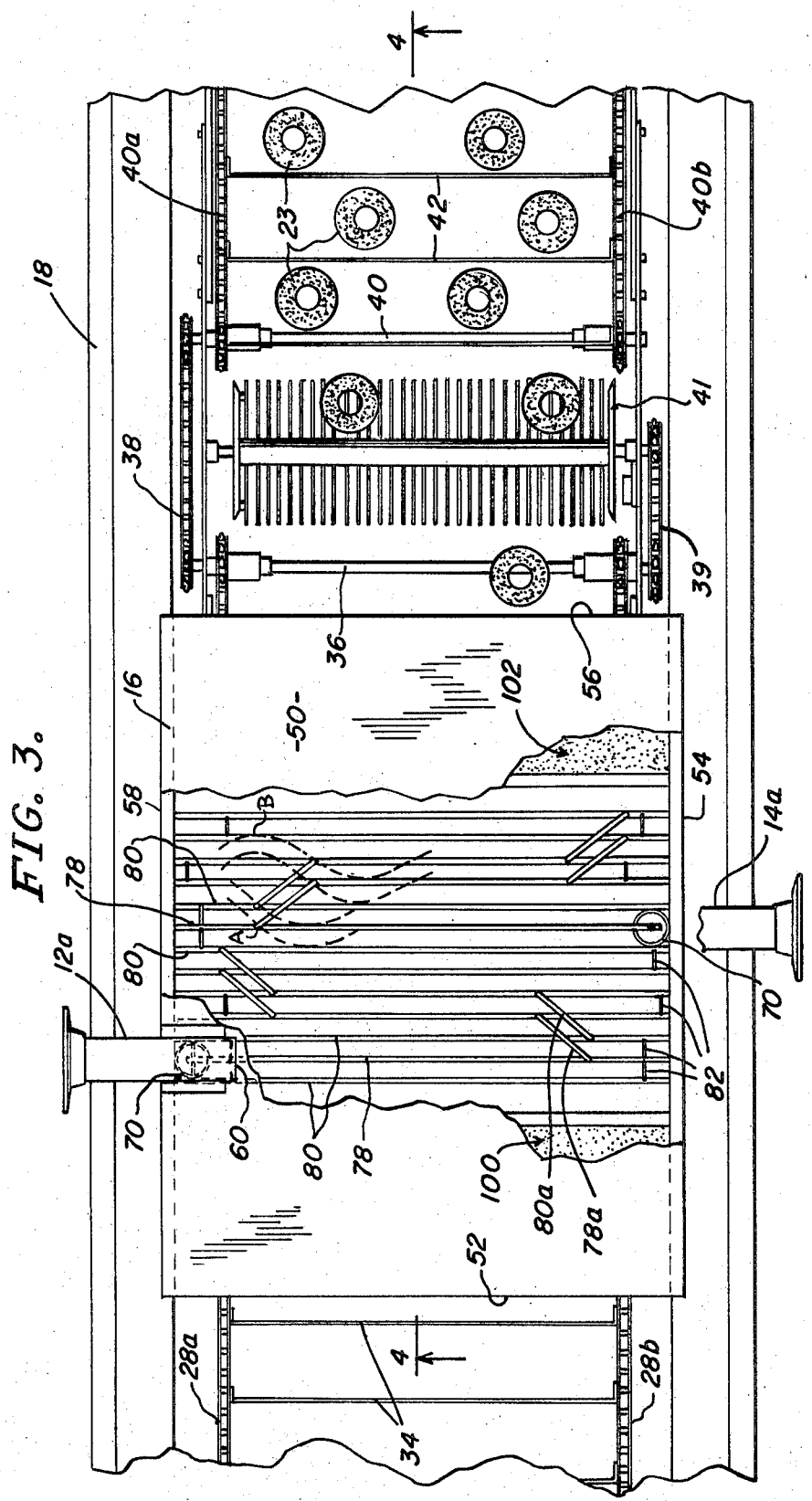
FIG. 3 is a partial plan view of the apparatus.

The microwave applicator chamber 16, shown in somewhat more detail in FIG. 3, can be seen to include a horizontally disclosed rectangular top wall 50, front wall 52, side walls 54 and 58, and a rear wall 56, the latter four of which are positioned vertically. Affixed as by welding rigidly between the sidewalls 54 and 58 extending horizontally at uniformly spaced intervals are transversely extending microwave antenna rods 78 and 80 which will be described in more detail below. A coaxial transition assembly used for coupling the energy from the guides 12a and 14a to the parallel rod antenna structure will now be described with reference to FIGS. 5, 6, and 7. Since the coaxial transition for the guides 12a and 14a are identical, only one will be described in detail. At the free end of the guide 12a is a stop 60 which is located at a selected distance (to provide optimum transmission) from an outer coaxial conductor 70 of the coaxial transition sectors extending downwardly from an opening 68 bored in the lower surface of the guide 12. The proper distance between the center of the conductor 70 and the stop 60 can be established empirically. The stop 60 can then be welded or otherwise affixed rigidly in position. The conductor 70 extends downwardly a short distance into the housing 16 and is secured thereto by a suitable bracket 71. Positioned immediately above and extending diametrically across the conductor 70 and the duct 12a is a cross member 62 formed from a conductor. Secured to the cross member 62 by a fastener such as screw 64 is a center conductor member 66 which at its lower end is secured to one end of a rod 78 by a suitable fastener such as a screw 76. The lower end of the conductor 70 is open and is cut on an incline proceeding upwardly toward the center of the conductor 70 to provide a vaulted outlet opening as seen from the center of the applicator 16.

As best shown in FIG. 6, the alternate rods 80 are rigidly secured to the sides of the conductor 70 by suitable fasteners such as screws 82. This way the potential on the rod 78 at any given point is 180° out of phase with the potential of the rods 80. Each rod 78 is approximately 1.2 inches from each adjacent rod for the case of 2,450 megahertz. Separation of the rod pairs from one another is an electrical distance, for example, about one quarter wavelength, in other words 3.06 CM or about one inch. The closer the rods are together, the closer the food products 23 will have to be to the rods to cut the flux lines. The rods can be five-sixteenths inches in diameter. The length of the rods are electrical multiples of one-half wavelength (6.12 centimeters). At the ends of the rods or near the ends of the rods are provided shorting plates 82 (FIGS. 3 and 4) which should be moved manually from the side toward the center of the machines until optimum results are obtained and then rigidly fixed in position for example, by welding.

Provided to carry the energy between a given pair of rods 78 and 80 to the next adjacent corresponding pair of rods 78 and 80 are parallel diagonally extending feed rods 78a and 80a which instead of transferring the energy along the axis of travel of the food products transfer the energy to a point spaced transversely by a short distance, for example, by a distance of one-half wavelength illustrated diagrammatically in FIG. 3 by dotted lines are standing peaks of waves in two adjacent pairs of rods showing that the power which is at a minimum at point A for a given pair of rods will be at a maximum for the next adjacent pair of rods at point B on a line extending in the direction of travel of the food pieces (i.e., in a horizontal plane perpendicular to the axis of the rods).

A potential exists between the rods. The electric fields terminate on charges moving along the surface of the two parallel rods as shown in broken lines in FIG. 8. The rods 80 therefore act as the walls of a waveguide as the waves pass from one end of the rod structure to the other. The parallel rod feed structures 78a, 80a place the nodes of microwave energy 180° out of phase along the axis of the apparatus. The length of each of the feed structures is the same as the wavelength being used, e.g., 4.8 inches. It should be understood that as the length of the rods varies the voltage and node points vary and that if the rods have the shorting plates 82 positioned 28 inches apart, the rod should be divided evenly into nodes which are about 4.8 inches apart.

In operation, the microwave energy supplied through wave guides 12a and 14a sets up a microwave field creating, via the coaxial transition 68–78, a microwave energy distribution on the rods 78 and and 80 to supply uniform microwave heating across the width of the applicator 16 over the period of time that the food products are within the enclosure 16. The lower surface of each piece is simultaneously cooked by the hot fat in the reservoir 18 which typically is at a temperature of about 375° F. It takes about 2 seconds for a donut to pass from one pair of rods to another. During this time, each donut passes from an energy peak for any given set of rods to a zero energy point at the next adjacent pair due to the lateral displacement of the energy transferred by the diagonally oriented feed rods 78a and 80a. In this way, all of the donuts being fried from one side of the apparatus to the other are supplied with the same amount of energy during the time they are in the applicator 16 even though peaks and valleys of energy exist along the length of each pair of antenna rods.

The energy distribution pattern around the rods can be best seen by reference to the diagram illustrated in FIG. 8. The lines of magnetic flux are indicated by numeral 81 and the electrostatic field is indicated by numeral 83. It will thus be understood that as the donuts pass close beneath the rods 78, 80 the flux lines will be concentrated most where the donuts are located and the power will drop off at an increasing rate further away from the rods. The microwave energy is therefore concentrated the most where it is most needed and less will be absorbed by the fat. In one application, the power drops by half each quarter of an inch proceeding downwardly from the rods 78, 80.

Figure 4:
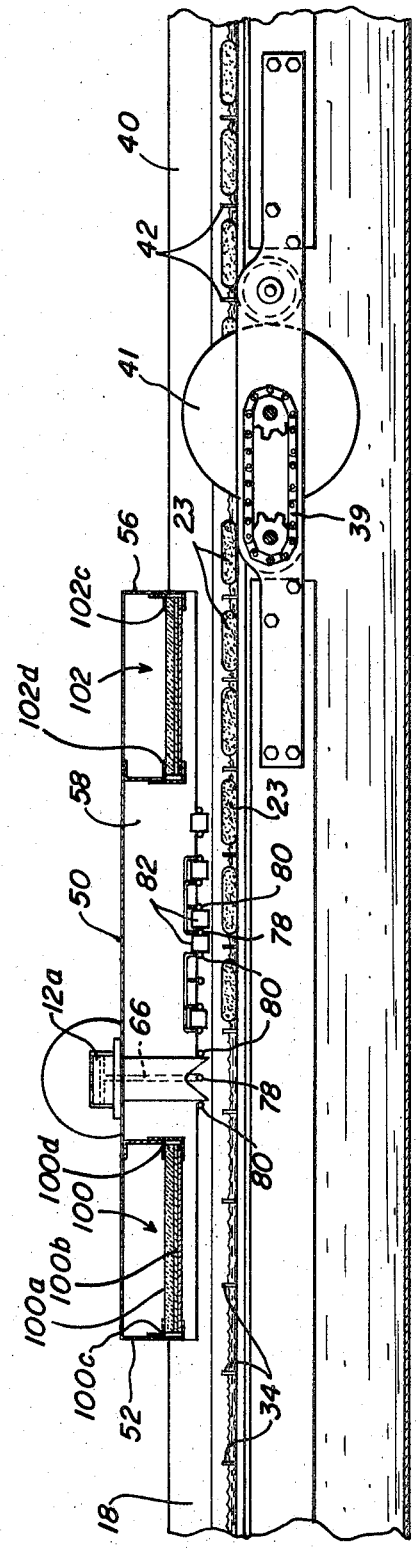
FIG. 4 is a vertical sectional view taken on line 4—4 of FIG. 3.

Refer now to FIGS. 3 and 4 which illustrate the protective end loads 100 and 102, each contained within generally rectangular enclosures defined in the case of the end load 100 by wall 52, a part of wall 58, wall 54 and a transversely extending wall 100d. Positioned horizontally within this chamber are two flat rectangular sheets of material including an upper layer of highly lossy material such as silicon carbide 100a to absorb microwave energy and a lower layer composed of a high dielectric substance such as Pyroceram 100b which couples the microwave energy better to the silicon carbide since the dielectric constant of silicon carbide may cause some of the microwave energy to be reflected. The rectangular sheets 100a and 100b are supported along their front and rear edges by a channel at the lower end of wall 100d and a similar retaining channel 100c on wall 52. Identical retaining channels are used in the end load 102. Thus, by providing the high dielectric Pyroceram material 100b in front of the silicon carbide layer 100a, less microwave energy is reflected. The Pyroceram layer is about one quarter wavelength in thickness. The silicon carbide layer is about a half an inch thick. The end load 102 is identical to the end load 100 and therefore will not be described in further detail. It was found that the end loads 100 and 102 effectively reduce and safely limit the amount of microwave energy escaping to the left or right from the microwave applicator into the air surrounding the fryer.

While the vertical distance of the donuts or other articles being fried from the rod 78, 80 can be varied to suit the particular operating circumstances, the best results have been obtained by maintaining the distance between the top of the food product and the lower surface of the rods between about one fourth inch and 1½ inches with one-half inches being typical. It should be clear that the greater the distance, the less efficient will be the coupling of energy.

The present invention is highly effective in coupling microwave energy to the donuts and minimizes the penetration of microwave energy into the frying fat. Additionally, the energy is distributed with sufficient uniformity both laterally and longitudinally so that the donuts are evenly cooked by the microwave energy.

After the donuts pass out of the microwave applicator 16, they are no longer subjected to the heating effect thereof and are conveyed to a conventional turner indicated generally at 41 in FIG. 3 which is operated by a chain and sprocket assembly 39 which inverts the donuts that then pass into a second stage conveyor 40 composed of laterally spaced chains 40a and 40b and laterally extending flight 42 for conveying the donuts to the outlet end of the apparatus. The browning reaction at the surface of the upper part of each donut which has been cooked and expanded by microwave energy is then completed by the heated fat.

What is claimed is:

1. A cooking apparatus for food products comprising:
   a. a vessel containing frying fat,
   b. a means for heating the fat,
   c. conveyor means in the vessel for moving the food products from one end of the vessel to the other,
   d. an enclosure over the fat,
   e. antenna rod elements spaced on the order of one fourth wavelength from one another, said rods being mounted within the enclosure and located in a horizontal plane parallel to the surface of the fat and being spaced at a predetermined distance thereabove less than a few inches from the upper surface of the food products and the top of the food products being spaced below the rod elements by a distance of between about ¼ and 1½ inches,
   f. microwave generating means having a wavelength of about 2,450 MH,
   g. antenna transition means connected between the rod elements and the microwave generating means to couple energy thereto from the microwave generating means to the elements to cause said microwave antenna rod elements to radiate microwave energy into the surrounding space,
   h. the microwave energy in the space surrounding the antenna elements decaying as a function of the distance away from the antenna element whereby energy is coupled with the greatest efficiency to the part of said food product closest to the antenna element and the absorption of microwave energy is reduced by a factor of about one half each one-fourth inches from the antenna rod elements and,
   i. rod feed structures connected between corresponding adjacent pairs of rods to transfer energy from one pair of rods to another adjacent pair, the ends of the rod feed structures being displaced laterally from one another whereby the wave peaks on the rods connected thereby are displaced laterally from one another to thereby distribute energy across the width of the microwave applicator.

2. The apparatus of claim 1 wherein said enclosure is a generally rectangular housing having horizontal top wall, vertically disposed side walls and is open at the bottom, microwave end load means are provided at the inlet and outlet ends thereof, said end load means including being constructed of a highly lossy material to prevent leakage of microwave energy from the ends of the housing.

3. The apparatus according to claim 1 wherein the end loads comprise a silicon carbide layer and a layer therebelow consisting of a material having a high dielectric constant and a thickness of about one-quarter of the wavelength of the microwave energy to increase the coupling efficiency between the microwave energy and the silicon carbide material.

4. A cooking apparatus for food products comprising a vessel containing frying fat, a means for heating the fat, conveyor means in the vessel for moving the food products from one end of the vessel to the other, and enclosure over the fat, an antenna rod element mounted within the enclosure and located in a plane parallel to the surface of the fat and being spaced at a predetermined distance thereabove between about ¼ inches and 1 and 1½ inches from the upper surface of the food products, microwave generating means, a coaxial antenna transition connected between the rod element and the microwave source to couple energy thereto from the external microwave energy source to the element to cause said microwave antenna rod element to radiate microwave energy into the surrounding space, the microwave energy in the space surrounding the antenna element decaying as a function of the distance away from the antenna element whereby energy is coupled with the greatest efficiency to the food product closest to the antenna element and the absorption of microwave energy is reduced at greater distances from the antenna rod elements, the antenna rod element comprises a plurality of parallel rods mounted in horizontal plane above the surface of the fat, the distance between the adjacent pairs of rods being about one fourth the wavelength of the microwave energy supplied thereto and shorting planes are positioned near the ends of the rods whereby the effective length of rods between the shorting planes is an electrical multiple of one-half wavelength to provide wave peaks centrally of the shorting planes and rod feed structures connected between corresponding adjacent pairs of rods to transfer energy from one pair of rods to another adjacent pair, the ends of the rod feed structues being displaced laterally from one another whereby the wave peaks are displaced laterally from one another to thereby distribute energy evenly across the width of the microwave applicator.

* * * * *